July 20, 1926.  
E. W. MAHAN  
1,592,984  
HYDROCARBON BURNER  
Filed Nov. 2, 1925    2 Sheets-Sheet 1
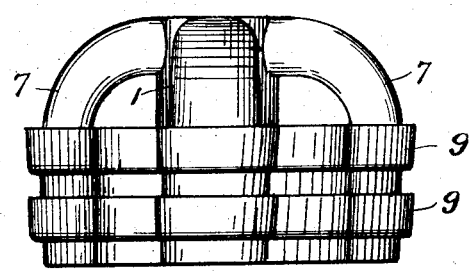
Fig 1
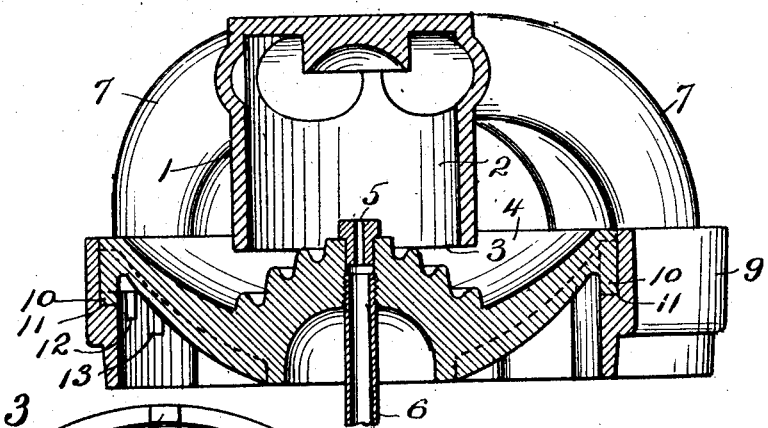
Fig 2
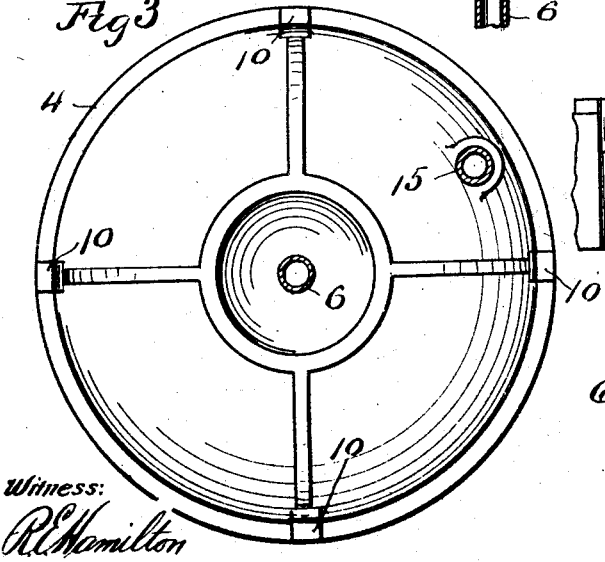
Fig 3
Fig 4
INVENTOR.  
Edward W. Mahan  
BY Warren D. House  
His ATTORNEY.

July 20, 1926.

E. W. MAHAN

HYDROCARBON BURNER

Filed Nov. 2, 1925

Witness:
R. E. Hamilton

INVENTOR.
Edward W. Mahan
BY Warren D. House
His ATTORNEY.

Patented July 20, 1926.

1,592,984

UNITED STATES PATENT OFFICE.

EDWARD W. MAHAN, OF KANSAS CITY, MISSOURI.

HYDROCARBON BURNER.

Application filed November 2, 1925. Serial No. 66,143.

My invention relates to improvements in hydrocarbon burners.

One of the objects of my invention is to provide a hydrocarbon burner with novel means for adjustably regulating the admixture of air and fuel vapor.

A further object of my invention is to provide novel means for adjustably supporting with respect to height the burner in the fire box of a stove or furnace.

Still another object of my invention is to provide a burner of the kind described, which is simple, cheap, durable, not liable to get out of order, which is easily and quickly assembled and which is readily mounted in a fire box, and which is efficient in operation.

The novel features of my invention are hereinafter fully described and claimed.

In the accompanying drawings, which illustrate the preferred embodiment of my invention, Fig. 1 is a side elevation of my improved burner, reduced.

Fig. 2 is a vertical sectional view, enlarged, on the line 2—2 of Fig. 6.

Fig. 3 is a bottom view of the bowl.

Fig. 4 is a fragmental vertical sectional view of a portion of the bowl and upper ring, on the line 4—4 of Fig. 6.

Similar reference characters designate similar parts in the different views.

Figure 5:
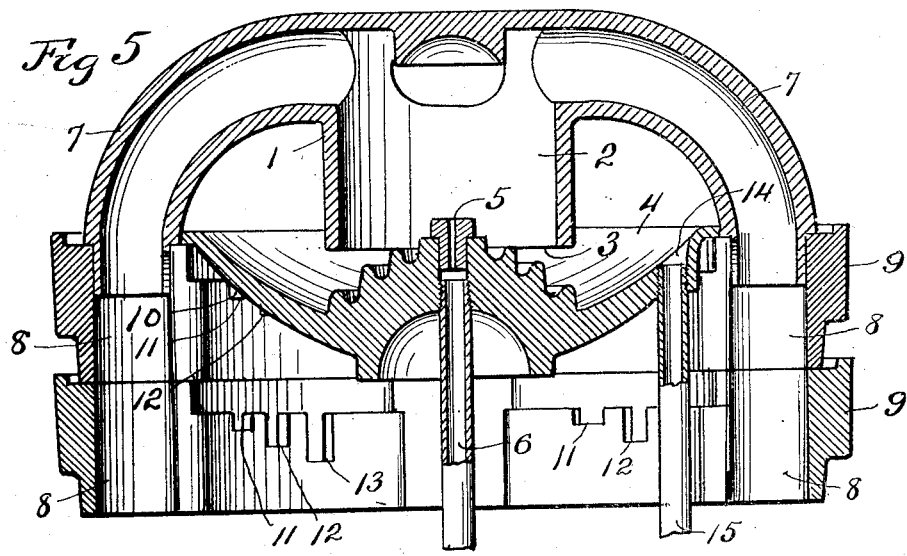
Fig. 5 is a vertical sectional view on the line 5—5 of Fig. 6.
Figure 6:
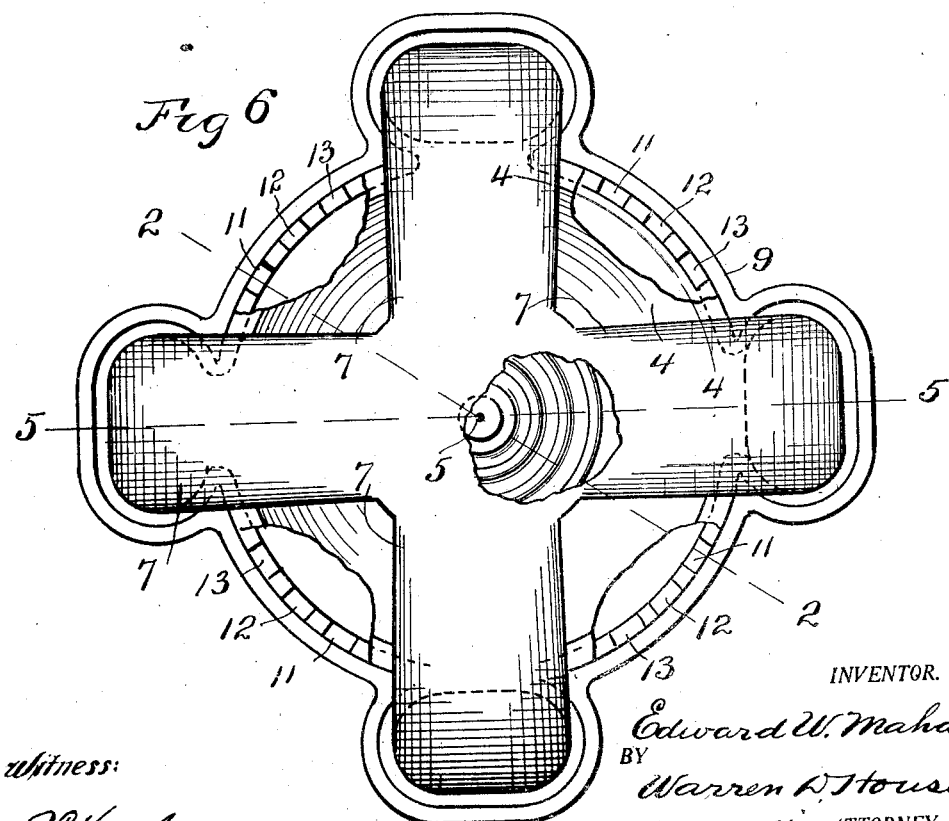
Fig. 6 is a plan view, partly broken away, of my improved burner.

1 designates a dome having a central mixing chamber 2 which has at its lower end an outlet 3, arranged to discharge against the upper side of a circular bowl 4, provided with a central fuel passage 5, which is supplied with fuel by a pipe 6, and which discharges centrally through the outlet 3, into the mixing chamber 2.

The dome 1 is provided with a plurality of tubular air conducting arms 7, the upper ends of which communicate with the chamber 2, and the lower ends of which respectively extend into and communicate with vertical air passages 8, provided in a ring 9, upon which the arms 7 rest, and which supports the bowl 4, below the dome.

As shown in Fig. 3, the bowl 4 is provided with a plurality of downwardly extending peripheral lugs 10. In the drawing, there are shown four such lugs circularly arranged and equally spaced apart.

The ring 9 is provided with circularly arranged upwardly facing sets of recesses adapted to form seats for supporting the lugs 10, each set comprising recesses of different depth. As shown in the drawing, each set comprises three recesses 11, 12 and 13, the lugs 10 being shown respectively disposed in the shallowest recesses 11. By turning the bowl 4 to a position in which the lugs 10 will enter the recesses 12, the bowl is lowered from the outlet 3 of the mixing chamber. Upon lifting the bowl and further revolving it, to a position in which the lugs 10 will register with the recesses 13, respectively, the bowl may be further lowered from the dome. By proper circumferential adjustment, as described, of the bowl 4, the proper position of the latter for best combustion with the particular flue with which the burner is used, and with the particular quantity of fuel that is being supplied, may be obtained.

The bowl may be provided with the usual overflow opening 14 which communicates with a drain pipe 15.

In order that the dome, bowl 4, and ring 9 may be supported in a fire bowl at different distances above the grate, there may be provided a plurality of rings 9, which are identical in construction, and which are adapted to be mounted one upon the other as shown in Figs. 1 and 5. When a plurality of rings 9 are so used, the lower end of each ring is formed so as to fit in the upper end of the other ring with the air passages 8 of the rings respectively alined, as shown in Fig. 5. The uppermost ring supports the bowl 4 and the legs 7 of the dome. Any number of such rings 9 may be employed to obtain the desired height of the dome and bowl above the grate on which the lowermost ring rests.

In the operation of the invention, fuel is permitted to flow through the passage 5 into the hollow upper side of the bowl, which thus forms a drip pan. This fuel is ignited, and in burning, heats the bowl 4 and dome 1, sufficiently to vaporize the fuel discharged from the passage 5. This vapor mixes with air entering the mixing chamber 2 through the passages 8 and tubular arms 7, and the mixture is discharged downwardly through the outlet 3 against the bowl 4 and into the atmosphere where it burns, thus affording heat for heating purposes and for continuing the vaporizing of the fuel.

It will be noted that the bowl 4 is separate from and is loosely connected to the ring 9 which supports it. By means of this construction, warping and cracking of the bowl is prevented. The bowl is relatively thin, and the ring is relatively heavy and is not exposed to the intense heat of the flame to the same extent as the bowl, and this separation between these two members permits them to independently expand and contract, thus avoiding liability of warping and cracking.

I do not limit my invention to the structure shown and described, as many modifications, within the scope of the appended claims, may be made without departing from the spirit of my invention.

What I claim is:—

1. In a hydrocarbon burner, a dome having a mixing chamber and an air passage discharging into the mixing chamber, the latter having an outlet, a bowl against which the outlet discharges having a fuel passage discharging through said outlet into the mixing chamber and provided with supporting lugs arranged in a circle, and a ring supporting the dome and having an air passage communicating with the air passage of the dome and having a plurality of sets of recesses circularly arranged and adapted to receive and form seats for said lugs respectively, the recesses of each set being of different depth, the bowl being revolubly supported on said ring by said lugs.

2. In a hydrocarbon burner, a plurality of rings adapted to be superposed one on the other and having respectively communicating air passages, each adapted to receive a tubular arm of a dome, each ring being adapted to support the dome having the tubular arm, and each ring having a plurality of sets of recesses adapted to form seats for receiving and supporting respectively lugs of a bowl adapted to be supported by any one of the rings, the recesses of each set being of different depth said sets being circularly arranged.

3. In a hydrocarbon burner, a dome having a mixing chamber and a plurality of tubular air conducting arms discharging into said chamber, the latter having an outlet, a bowl against which the outlet discharges having a fuel passage discharging through said outlet into said mixing chamber, and a ring supporting said dome and having a plurality of air passages respectively communicating with said tubular arms, the ring having circularly arranged recesses adapted to form seats, the recesses of each set being of different depth, the bowl being revoluble on said ring and provided with supporting lugs adapted to respectively rest on said seats.

In testimony whereof I have signed my name to this specification.

EDWARD W. MAHAN.